US006974611B2

(12) United States Patent
Sakatani et al.

(10) Patent No.: US 6,974,611 B2
(45) Date of Patent: Dec. 13, 2005

(54) TITANIUM OXIDE DISPERSION COMPOSITION, AND METHOD AND CONTAINER FOR PRESERVING THE SAME

(75) Inventors: Yoshiaki Sakatani, Niihama (JP); Kensen Okusako, Niihama (JP); Hironobu Koike, Saijo (JP)

(73) Assignee: Sumitomo Chemical Company, Limited, Osaka (JP)

( * ) Notice: Subject to any disclaimer, the term of this patent is extended or adjusted under 35 U.S.C. 154(b) by 10 days.

(21) Appl. No.: 10/456,746

(22) Filed: Jun. 9, 2003

(65) Prior Publication Data

US 2003/0236317 A1 Dec. 25, 2003

(30) Foreign Application Priority Data

Jun. 25, 2002 (JP) ............................. 2002-184106

(51) Int. Cl.[7] .................. B29D 22/00; B29D 23/00; B32B 1/08; C09C 1/36
(52) U.S. Cl. ................. 428/34.1; 428/35.7; 106/436; 106/437
(58) Field of Search ................ 428/34.1, 35.7, 428/402; 106/436, 437; 429/111; 422/24

(56) References Cited

U.S. PATENT DOCUMENTS

| | | | |
|---|---|---|---|
| 2,480,092 | A | 8/1949 | Wahtely |
| 4,165,239 | A | 8/1979 | Linden et al. |
| 5,011,674 | A | 4/1991 | Yoshimoto et al. |
| 5,840,111 | A * | 11/1998 | Wiederhoft et al. ........ 106/436 |
| 6,013,372 | A | 1/2000 | Hayakawa et al. |
| 6,547,075 | B1 * | 4/2003 | Usui ......................... 206/455 |
| 2002/0005145 | A1 | 1/2002 | Sherman |
| 2002/0012628 | A1 | 1/2002 | Sawabe et al. |
| 2002/0021999 | A1 | 2/2002 | Sakatani et al. |
| 2002/0051746 | A1 | 5/2002 | Okusako |
| 2003/0027704 | A1 | 2/2003 | Sakatani et al. |
| 2003/0161784 | A1 | 8/2003 | Okusako et al. |

FOREIGN PATENT DOCUMENTS

| | | |
|---|---|---|
| EP | 0 666 107 A2 | 8/1995 |
| EP | 44 10 662 C1 | 9/1995 |
| EP | 0 675 086 A2 | 10/1995 |
| EP | 0 846 494 A1 | 6/1998 |
| EP | 1 031 538 A1 | 8/2000 |
| EP | 1 065 169 A1 | 1/2001 |
| EP | 1 095 908 A1 | 5/2001 |
| EP | 1 127 844 A1 | 8/2001 |
| EP | 1 138 634 A1 | 10/2001 |
| EP | 1 160 202 A1 | 12/2001 |
| EP | 1 174 392 A1 | 1/2002 |
| EP | 1 178 011 A1 | 2/2002 |
| EP | 1 188 718 A2 | 3/2002 |
| EP | 1 199 103 A2 | 4/2002 |
| EP | 1 205 244 A1 | 5/2002 |
| EP | 1 219 569 A2 | 7/2002 |
| EP | 1 279 643 A2 | 1/2003 |
| EP | 1 285 953 A1 | 2/2003 |
| EP | 1 338 564 A2 | 8/2003 |
| FR | 2 677 012 A1 | 12/1994 |
| JP | 62-207718 A | 9/1987 |
| JP | 2000-140636 A | 5/2000 |
| JP | 2001-096168 A | 4/2001 |
| JP | 2001-098220 A | 4/2001 |
| JP | 2001-278627 A | 10/2001 |
| JP | 2003-048715 A | 2/2003 |
| JP | 2003-171578 A | 6/2003 |
| JP | 2003-221230 A | 8/2003 |
| WO | WO 96/29375 A1 | 9/1996 |
| WO | 10-67516 A | 3/1998 |
| WO | WO 00/10921 A1 | 3/2000 |
| WO | WO 00/18686 A1 | 4/2000 |
| WO | WO 01/56928 A1 | 8/2001 |
| WO | WO 02/40609 A1 | 5/2002 |

OTHER PUBLICATIONS

Lei et al., "Studies on Process Conditions of Preparing Nano-Titanium Dioxide with Homogenous Precipitation Method", *Inorganic Chemicals Industry*, vol. 33, No. 2, Mar. 2001, pp. 3-5, with English translation.

U.S. Appl. No. 10/732,367, filed Dec. 11, 2003, Okusako.

E. Kanezaki et al., "Solid-State Chemistry of Thermally Induced Yellow Coulouring in Synthetic Hydrous Titanum Oxide fromTiCl3", J. Chem. Soc. Faraday Trans., vol. 88, No. 24, 1992, pp. 3583-3586.

Abstract of Fang et al., "Preparation of fine spherical titania particles by thermolysis of the peroxo complex", STN Chemical Abstracts, vol. 120, No. 8, Feb. 21, 1994 (XP-002139805).

(Continued)

Primary Examiner—Michael C. Miggins
(74) Attorney, Agent, or Firm—Sughrue Mion, PLLC

(57) ABSTRACT

A titanium oxide dispersion composition is provides, the composition comprising a solvent and a titanium oxide with an average secondary particle diameter of 100 nm or smaller, the dispersion composition having a maximum intensity within the range of from 435 nm to 700 nm of a primary differential spectrum of a transmittance spectrum, wherein the transmittance spectrum is measured using an ultraviolet-visible spectrophotometer after adjusting a solid content of the dispersion composition to be about 2% by weight. The composition provides a film having a high hydrophilicity under the irradiation of a visible light.

5 Claims, 3 Drawing Sheets

OTHER PUBLICATIONS

Patent Abstracts of Japan, vol. 1997, No. 07, Jul. 31, 1997 (corresponding to JP 09-071418).

Database WPI, Section Ch, Week 199802, Derwent Publications, Ltd., XP002268023 corresponding to JP 09-278443.

U.S. Appl. No. 10/644,979, filed Sep. 22, 2003, to Sakatani et al.

R. Asahi et al., "Visible-Light Photocatalysis in Nitrogen-Doped Titanium Oxides", vol. 293, Jul. 13, 2001, pp. 269-271.

M. Miyauchi et al., "Reversible wettability control of $TiO_2$ surface by light irradiation", Surface Science 511, (2002), pp. 401-407 with Abstract.

Shinri Sato, "Photocatalytic Activity of $NO_x$-Doped $TiO_2$ in the Visible Light Region", *Chemical Physics Letters*, vol. 123, No. 1,2, Jan. 3, 1986, pp. 126-128.

U.S. Appl. No. 10/438,813, filed May 16, 2003 to Sakatani et al.

* cited by examiner

TITANIUM OXIDE DISPERSION COMPOSITION, AND METHOD AND CONTAINER FOR PRESERVING THE SAME

BACKGROUND OF THE INVENTION

1. Field to the Invention

The present invention relates to a titanium oxide dispersion composition, a method for preserving the composition and a container for preserving the composition. In particular, the invention relates to a titanium oxide dispersion composition suitable for providing a photocatalyst film, a method for preserving the composition and a container for preserving the composition.

2. Description of the Related Art

A film capable of exhibiting hydrophilicity when irradiated with light has recently become of interest. Many researches have been made concerning titanium oxide dispersion compositions for photocatalyst which can provide such a film. Some of such dispersion compositions have been commercially available. There are some films which are made of the commercially available titanium oxide dispersion compositions for photocatalyst and exhibit hydrophilicity to some extent when irradiated with ultraviolet light. However, such films exhibit insufficient hydrophilicity when irradiated with visible light.

SUMMARY OF THE INVENTION

The present inventors researched in order to develop a titanium oxide dispersion composition which can provide a film having a high hydrophilicity under visible-light irradiation. As a result, the present inventors have found that a titanium oxide dispersion composition with combination properties of a preferable particle size and a preferable spectroscopic characteristic of a titanium oxide therein can provide such a film. Also, the present inventors have found a method and a container for preserving the titanium oxide dispersion composition which can maintain the properties of the titanium oxide. Thus, they have accomplished the present invention.

The present invention provides a titanium oxide dispersion composition comprising a solvent and a titanium oxide with an average secondary particle diameter of 100 nm or smaller, the dispersion composition having a maximum intensity within the range of from 435 nm to 700 nm of a primary differential spectrum of a transmittance spectrum, wherein the transmittance spectrum is measured using an ultraviolet-visible spectrophotometer after adjusting a solid content of the dispersion composition to be about 2% by weight.

Also, the present invention provides a method for preserving a titanium oxide dispersion composition, the method comprising a step of shielding about 90% or higher of the light having a wavelength ranging from 400 nm to 600 nm while shielding about 80% or lower of the light having a wavelength ranging from 600 nm to 800 nm.

Further, the present invention provides a container suitable for preserving the above titanium oxide dispersion composition. That is, the present invention provides a container, which may be useful for preserving the above titanium oxide dispersion composition, the container comprising a wall with a transmittance of about 10% or lower of the light having a wavelength ranging from 400 nm to 600 nm and with a transmittance of about 20% or higher of the light having a wavelength ranging from 600 nm to 800 nm.

DESCRIPTION OF THE PREFERRED EMBODIMENTS

Figure 1:
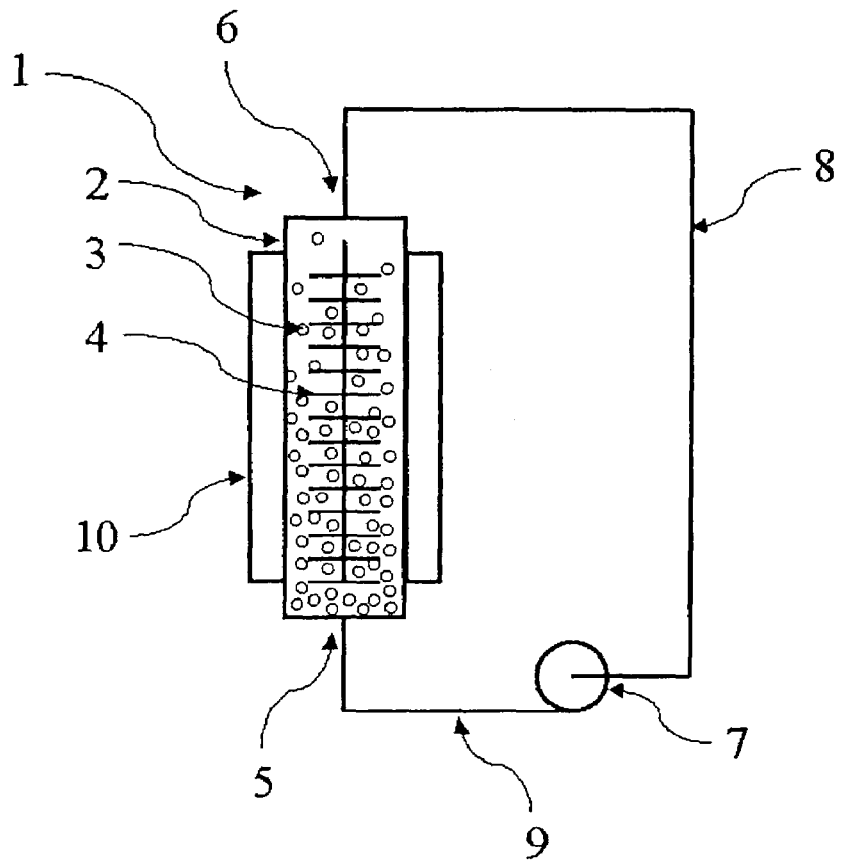
FIG. 1 shows an example embodiment of an apparatus used for conducting dispersion treatment in preparing a titanium dispersion composition of the present invention.

A titanium oxide dispersion composition in the present invention comprises a titanium oxide and a solvent. The titanium oxide in the dispersion composition can be represented by a formula of $TiO_2$ and may have an average secondary particle diameter of about 100 nm or smaller, when measured in the dispersion composition. The smaller the average particle diameter, the more preferred. For example, the average particle diameter is preferably about 60 nm or smaller, and is more preferably about 40 nm or smaller. The average particle diameter of the titanium oxide may be measured while being dispersed in the titanium oxide dispersion composition.

The titanium oxide in the present invention preferably has a crystal structure comprising anatase, rutile or brookite, and more preferably has a single phase of anatase. Also, the titanium oxide preferably exhibits a catalytic activity under a visible-light irradiation.

The solvent in the titanium oxide dispersion composition in the present invention include an aqueous medium such as an ion-exchange water and an aqueous hydrogen peroxide solution; an alcoholic medium such as an ethanol, a methanol, a 2-propanol and a butanol; a ketonic medium such as an acetone and a 2-butanone; a paraffin compound medium such as a hexane and a heptane; and an aromatic compound medium such as a benzene, a phenol, a toluene, a xylene and an aniline. Among them, preferred are an aqueous medium and an alcoholic medium.

A titanium oxide dispersion composition in the present invention may have a maximum intensity within the range of from 435 nm to 700 nm of a primary differential spectrum, that is a spectrum obtained by differentiation of a transmittance spectrum with respect to wavelength. (Hereinafter, such a primary differential spectrum may be referred to as "a primary differential transmittance spectrum".) Such a titanium oxide dispersion composition having a maximum intensity within the above-mentioned range in the primary differential transmittance spectrum can provide a film with a high hydrophilicity when irradiated with a visible light. The titanium oxide dispersion composition in the present invention preferably have a maximum intensity in the range of about 450 nm or longer, more preferably in the range of about 480 nm or longer, and preferably have a maximum intensity in the range of about 700 nm or shorter, more preferably in the range of about 670 nm or shorter. The transmittance spectrum can be measured with an ultraviolet-visible spectrophotometer after adjusting a solid content of the composition to be about 2% by weight.

A titanium oxide dispersion composition in the present invention may have index X of about 0.175 or less, preferably of about 0.1 or less, and more preferably of about 0.025 or less, index X being calculated by formula (1) below:

$$X = T_2/T_1 \tag{1}$$

wherein $T_1$ (%) is a transmittance at a wavelength of 800 nm and $T_2$ (%) is a transmittance at a wavelength of 400 nm. When irradiated by a visible light, a film made from a dispersion composition having index X of about 0.175 or less can particularly have a hydrophilicity higher than that of a film with index X of about more than 0.175.

The content of the above-described titanium oxide in a dispersion composition of the present invention may be about 2% by weight or more and is preferably about 5% by weight or more, and may be about 30% by weight or less and is preferably about 10% by weight, based on the titanium oxide dispersion composition. The titanium oxide content may be controlled appropriately, depending on the kind of a material to which the resulting film made from the dispersion composition is applied, the desired thickness of the film and the like. The dispersion composition may contain an amorphous titanium oxide and may contain an inorganic compound other than titanium oxide and/or an organic compound, depending on the way and the purpose of its use. Such an inorganic compound and organic compound may be in the form of granule or liquid. Examples of the inorganic compound include a silica, an alumina, a zeolite, a molecular sieve, an activated carbon, a calcium phosphate, a zinc oxide, a zirconia, a magnesium oxide, a calcium oxide, a strontium oxide, a barium oxide, a magnesium hydroxide, a strontium hydroxide, a barium hydroxide, a lanthanum oxide, a cerium oxide, a lanthanum hydroxide, a cerium hydroxide, an amorphous silica, and an amorphous alumina. The organic compounds include binders. These inorganic compounds and organic compounds may be used singly or in combination of two or more of them.

A titanium oxide dispersion composition in the present invention, which comprises the titanium oxide having the above-described particle diameter and which has the above-described spectroscopic characteristics, can be obtained, for example, in a method of mixing the titanium oxide (which has a catalytic activity under a visible-light irradiation) with a solvent and conducting dispersion treatment using a mill.

The titanium oxide exhibiting a catalytic activity under visible-light irradiation, which may be used in the present invention, can be prepared by, for example, a method comprising the steps of reacting a titanium compound (such as a titanium trichloride [$TiCl_3$], a titanium tetrachloride [$TiCl_4$], a titanium sulfate [$Ti(SO_4)_2 \cdot mH_2O$, $0 \leq m \leq 20$], a titanium oxysulfate [$TiOSO_4 \cdot nH_2O$, $0 \leq n \leq 20$] and a titanium oxychloride [$TiOCl_2$]) with a base (such as an ammonia, a hydrazine, a hydroxylamine, a monoethanolamine, an acyclic amine compound and a cyclic aliphatic amine) in the presence of a hydrogen peroxide under a pH of from about 2 to about 7 (preferably under a pH of from about 3 to about 5) at a temperature of about 90° C. or lower (preferably at a temperature of about 70° C. or, and more preferably at a temperature of about 55° C. or lower); maintaining a resulting reaction mixture while stirring; adding a base (such as an ammonia) to obtain a slurry; subjecting the slurry to solid-liquid separation; and calcining a resulting solid in the air at a temperature of about 300° C. or higher (preferably at a temperature of about 350° C. or higher) and at a temperature of about 500° C. or lower (preferably a temperature of about 400° C. or lower). The total amount of the base used for the reaction and the base added after maintaining the reaction mixture is preferably more than a stoichiometric amount of the bases required for converting the titanium compound into a titanium oxide in the presence of water. The total amount of the bases is preferably about 1.1 molar times or more (more preferably about 1.5 molar times or more) and is preferably about 20 molar times or less (more preferably about 10 molar times or less), based on the stoichiometric amount.

A titanium oxide dispersion composition in the present invention may contain a dispersing agent, which may be added before conducting dispersion treatment in preparing the dispersion composition. Examples of the dispersing agent include an inorganic acid, an inorganic base, an organic acid, an organic base and the salts of the organic acid. Specific examples of the inorganic acid include a binary acid (also called a hydroacid) such as a hydrochloric acid; and an oxyacid (also called an oxygen acid) such as a nitric acid, a sulfuric acid, a phosphoric acid, a perchloric acid and a carbonic acid. Specific examples of the inorganic base include an ammonia, a lithium hydroxide, a sodium hydroxide, a potassium hydroxide, a rubidium hydroxide and a cesium hydroxide. Specific examples of the organic acid include a monocarboxylic acid such as a formic acid, an acetic acid and a propionic acid; a dicarboxylic acid such as an oxalic acid, a glutaric acid, a succinic acid, a malonic acid, a maleic acid and an adipic acid; a tricarboxylic acid such as a citric acid; and an amino acid such as a glycine. Specific examples of the organic base include an urea. Specific examples of the salt of the organic acid include a carboxylate such as an ammonium oxalate and a sodium oxalate. The amount of the dispersing agent to be used may be about 0.005 molar times or more (and is preferably about 0.01 molar times or more and is more preferably about 0.03 molar times), and may be about 400 molar times or less (and is preferably about 5 molar times or less), based on the titanium oxide contained together.

In preparing a titanium oxide dispersion composition in the present invention, a mill may be used for employing dispersion treatment. The mill may comprise a vessel, a medium for dispersion contained in the vessel and a stirring mechanism inserted in the medium. In the mill, force is transferred to the medium by the stirring mechanism so that dispersion treatment is conducted due to shear and friction of the medium. The mill is classified, for example, into screw type, flow tube type, stirring vessel type, and annular type, which can be classified by the structure of the stirring mechanism. An example of the commercially available mill is SUPER APEX MILL (which is a brand name, manufactured by Kotobuki Engineering & Manufacturing Co., Ltd). Examples of the medium for dispersion include beads or balls, which are made of zirconia, glass, alumina or the like. The medium for dispersion may have a diameter of about 0.3 mm or less, preferably has a diameter of about 0.2 mm or less, and more preferably has a diameter of about 0.1 mm or less.

Referring now to FIG. 1, an example embodiment of dispersion treatment using a mill is illustrated as follows:

Main body 1 of the mill is composed of vessel 2, medium 3 for dispersion in vessel 2, stirring blade 4 for stirring medium 3 and a motor (not shown) for driving stirring blade 4. Vessel 2 is provided with inlet 5 through which a mixture of a titanium oxide with a solvent is introduced and outlet 6 through which the resulting mixture obtained after the dispersion treatment is discharged. Outlet 6 of vessel 2 and pump 7 are connected with each other through pipe 8. Pump 7 and inlet 5 are connected with each other through pipe 9. These are designed so that the mixture obtained after the dispersion treatment is introduced repeatedly into vessel 2 by pump 7. In this mill, the average secondary particle size of the titanium oxide in the resulting dispersion composition and the spectroscopic characteristics of the dispersion composition can be controlled by changing the amount of the medium for dispersion, the peripheral rate of the stirring blade, the flow rate of the circulating pump 7 (which corresponds to a flow rate of a circulating mixture), the period of time for the treatment and the like. To suppressing the increase of the temperature in vessel 2 due to heat by shear or friction of the medium for dispersion, it is preferred to equip cooling mechanism 10 to main body 1 of the mill, pipe 8 and/or pipe 9.

The dispersion treatment is preferably carried out under conditions where no change is substantially caused in the crystal structure of the titanium oxide to be treated. For example, the dispersion treatment is preferably conducted at a temperature lower than about 90° C. From the viewpoint of maintaining the crystal structure of the titanium oxide, the dispersion composition treatment is preferably conducted at a low temperature and, therefore, is more preferably conducted at a temperature of about 80° C. or lower, and is most preferably conducted at a temperature of about 75° C. or lower. On the other hand, since the stability of the resulting dispersion composition may be deteriorated when the treating temperature is too low, the dispersion treatment is preferably conducted at a temperature of about 10° C. or higher, and is more preferably conducted at a temperature of about 15° C. or higher. The dispersion treatment may be carried out in two or more stages. It may also be carried out after the pH of the mixture is adjusted, if necessary. In the pH adjustment, an acid (such as a hydrochloric acid, a nitric acid, a phosphoric acid, a sulfuric acid and an oxalic acid) and/or a base (such as an ammonia, an urea, a hydrazine, a lithium hydroxide, a sodium hydroxide, a potassium hydroxide, a cesium hydroxide and a rubidium hydroxide) may be used. Before or after the dispersion treatment, an inorganic compound (such as a silica, an alumina, a zeolite, a molecular sieve, an activated carbon, a calcium phosphate, a zinc oxide, a zirconia, a magnesium oxide, a calcium oxide, a strontium oxide, a barium oxide, a magnesium hydroxide, a strontium hydroxide, a barium hydroxide, a lanthanum oxide, a cerium oxide, a lanthanum hydroxide, a cerium hydroxide, an amorphous titanium oxide, an amorphous silica and an amorphous alumina) and an organic compound (such as a binding agent) may be added to the mixture. After the dispersion treatment, an operation of removing coarse particles such as aggregate particles of titanium oxide remaining in the mixture or an operation of adjusting the titanium oxide content may be effected, if necessary.

In the present invention, a container which may be useful for preserving the above-described titanium oxide dispersion composition is also provide. The container may comprises a wall with a transmittance of about 10% or lower of the light having a wavelength ranging from 400 nm to 600 nm and with a transmittance of about 20% or higher of the light having a wavelength ranging from 600 nm to 800 nm. Preferably, the container comprises a wall with a transmittance of about 50% or higher of the light having a wavelength ranging from 600 nm to 800 nm.

These light transmittances of the container wall can be measured as follows:

The wall, which have been cut out of the container, is used to obtain a transmittance spectrum thereof. The transmittance is measured every 0.5 nm using a ultraviolet-visible light spectrophotometer (trade name: UV-2500PC; manufactured by Shimadzu Corp.) with an integrating sphere and a barium sulfate as a standard white plate. The average transmittances of the light having a wavelength ranging from 400 nm to 600 nm and the of the light having a wavelength ranging from 600 nm to 800 nm are calculated, respectively, and are used as the light transmittances of the container wall.

The preservation container having such a container wall is suitable for preservation of the above-described titanium oxide dispersion composition in ordinary preservation conditions (for example, under outdoor or under indoor lighting conditions). When preserving a dispersion composition in this preservation container, it is possible to store the dispersion composition outdoor (for example, under solar illumination of 150,000 lux or lower) or under indoor lighting for a long period of time without damaging its physical and chemical properties, and to have good handling properties (such as workability) since the amount of the remaining dispersion composition in the container can be visually checked easily during its use. The container wall may be made of any material capable of achieving the above-mentioned transmittance characteristics. Examples of the material for the container wall include glass, plastics and ceramics. Alternatively, the plate of such a material to which an optically functional film (such as a shielding film) is attached or in which pigments or the like are included therein are also available as the container wall in the present invention.

The method for preserving a titanium oxide dispersion composition in the present invention is not limited to the usage of the above-described container, which is one example of preserving the dispersion composition. Moreover, the present invention provides a suitable method for preserving the titanium oxide dispersion composition, the method comprising a step of shielding about 90% or higher of the light having a wavelength ranging from 400 nm to 600 nm while shielding about 80% or lower of the light having a wavelength ranging from 600 nm to 800 nm.

As described above, the titanium oxide dispersion composition in the present invention can provide a film having a high hydrophilicity under the irradiation with a visible light. Also, in accordance with the present invention, a method and a container for appropriately preserving a titanium oxide dispersion composition is provided. The method and the container permits the titanium oxide dispersion composition to be stored outdoor or under indoor lighting for a long period of time without damage of its physical and chemical properties, and also brings improvement in workability in painting the composition or the like.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2002-184106 filed on Jun. 25, 2002 indicating specification, claims, drawings and summary, are incorporated herein by reference in their entirety.

EXAMPLES

The present invention is described in more detail by following Examples, which should not be construed as a limitation upon the scope of the present invention.

A transmittance of a titanium oxide dispersion composition, a wavelength at which the intensity of a primary differential spectrum becomes maximum, and an average secondary particle diameter and crystal structure of titanium oxide were determined by the following methods.

Transmittance (%) and Primary Differential Transmittance Spectrum

Into a quartz cell (having 1 cm width, 1 cm length and 4.5 cm height), was introduced a sample titanium oxide dispersion composition, of which solid content had been adjusted to be 2% by weight. Into another quartz cell of the same type, water was introduced. Using an ultraviolet-visible spectrophotometer (trade name: UV-2500PC, manufactured by Shimadzu Corp.) equipped with an integrating sphere, the latter cell as a reference cell and a barium sulfate as a standard white plate, a transmittance spectrum of the sample titanium dispersion composition was measured every 0.5 nm. From the spectrum, a transmittance $T_1$ (%) at 800 nm and a transmittance $T_2$ (%) at 400 nm were calculated. A primary differential transmittance spectrum was obtained, using a software included in the ultraviolet-visible spectrophotometer, by differentiating the transmittance spectrum within the wavelength range of from 400 nm to 760 nm with respect to wavelength $\lambda$ under a condition of $\Delta\lambda=40$ nm. Furthermore, a wavelength at which the intensity of the primary differential spectrum became maximum was determined using this software.

Average Secondary Particle Diameter (nm)

A particle-size distribution of a titanium oxide in a sample dispersion composition was measured using a submicron particle size distribution analyzer (trade name: N4Plus, manufactured by COULTER), and then a diameter at which the particle-size cumulative distribution reaches 50% by weight was calculated. Thus obtained diameter was used as an average secondary particle diameter of the titanium oxide in the sample dispersion composition.

Crystal Structure

A sample dispersion composition was dried using an evaporator at 40° C. to obtain a powder. A X-ray diffraction spectrum of the powder was measured using an X-ray diffraction analyzer (trade name: RAD-IIA, manufactured by Rigaku Corp.) From the spectrum, a crystal structure of the titanium oxide in the sample was determined.

Example 1

Preparation of Titanium Oxide

An aqueous titanium oxysulfate solution was prepared by dissolving 3388 g of a titanium oxysulfate (trade name: TM Crystal, having an appearance of white solids, manufactured by Tayca Corp.) in 2258 g of ion-exchange water. Into the above-prepared aqueous titanium oxysulfate solution, a 1479 g of an aqueous hydrogen peroxide solution (31% by weight) was added while cooling with ice, to obtain a rose-colored mixture. Into a reaction vessel equipped with a pH electrode and a pH controller that is connected to the pH electrode so that the pH of a mixture in the vessel is controlled by adding a 25% by weight of an ammonia water (extra-pure grade, manufactured by Wako Pure Chemical Industries, Ltd.), 4700 g of ion-exchange water was introduced. The pH controller was set to pH 4. The supplying rate of the ammonia water was set to 50 ml/min. In the reaction vessel, when pH of the mixture in the vessel becomes lower than the set value, the ammonia water starts to be supplied and is continuously supplied at the above-set supplying rate until pH reaches the pH-set value. While stirring at 145 rpm, the above-obtained mixture was added to the reaction vessel at a rate of 50 ml/min, to react the titanium oxysulfate with the ammonia water that was supplied by the pH controller. At this time, the reaction temperature was in the range of from 23° C. to 51° C. The resulting mixture was maintained for one (1) hour while stirring, and then a 25% by weight of an ammonia water (extra-pure grade, manufactured by Wako Pure Chemical Industries, Ltd.) was further added thereto, to obtain a slurry. The total amount of the ammonia water added to the reaction vessel was 3690 g, which is twice as much as the amount required for conversion of the titanium oxysulfate to a titanium hydroxide. The slurry was filtered, and the resulting solid was rinsed with ion-exchange water, was dried, and was calcined at a temperature of 350° C. in air for 8 hours. The solid then was cooled down to a room temperature (about 20° C.), to obtain a granular titanium oxide. The titanium oxide had a crystal structure of anatase and a water content of 15% by weight.

Preparation of Titanium Oxide Dispersion Composition

An aqueous solution obtained by dissolving 18.5 g of an oxalic acid dihydrate (extra-pure grade, manufactured by Wako Pure Chemical Industries, Ltd.) and 20 g of an ammonium oxalate monohydrate (extra-pure grade, manufactured by Wako Pure Chemical Industries, Ltd.) in 1287 g of ion-exchange water was mixed with 225 g of the above-obtianed granular titanium oxide. The resulting mixture was subjected to dispersion treatment using a mill (trade name: SUPER APEX MILL, manufactured by Kotobuki Engineering & Manufacturing Co., Ltd.) under the conditions as follows.

Medium for dispersion: 2.22 kg of zirconia beads with a diameter of 0.05 mm,

Peripheral rate of stirring blade: 9.7 m/sec,

Flow rate of circulating mixture: 28 kg/h,

Treating temperature: from 18° C. to 28° C., and

Period of time for the treatment: 70 min.

After the treatment, the mixture was filtered to obtain a dispersion composition. The titanium oxide in the dispersion composition had an average secondary particle diameter of 37 nm and a crystal structure of anatase.

Figure 2:
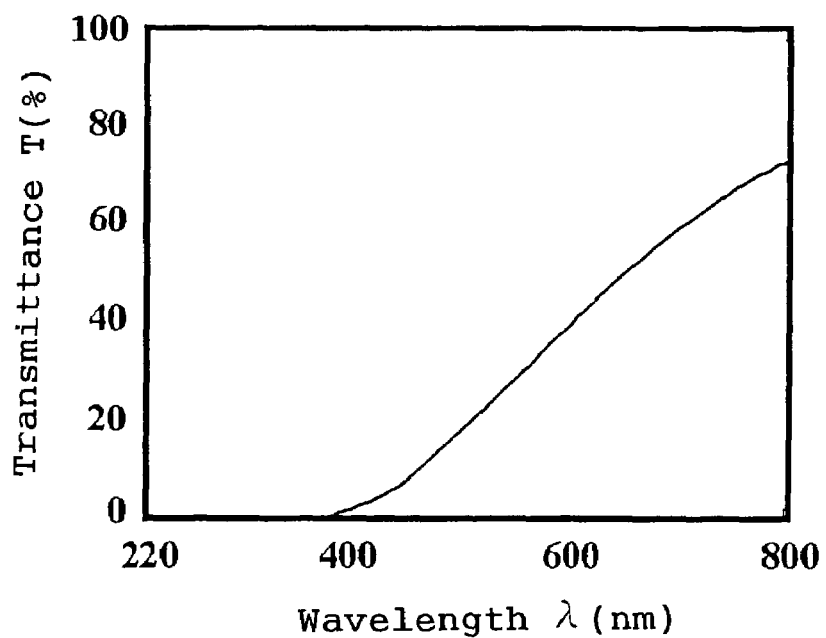
FIG. 2 shows a transmittance spectrum of a titanium oxide dispersion composition in the present invention (see, Example 1)
Figure 3:
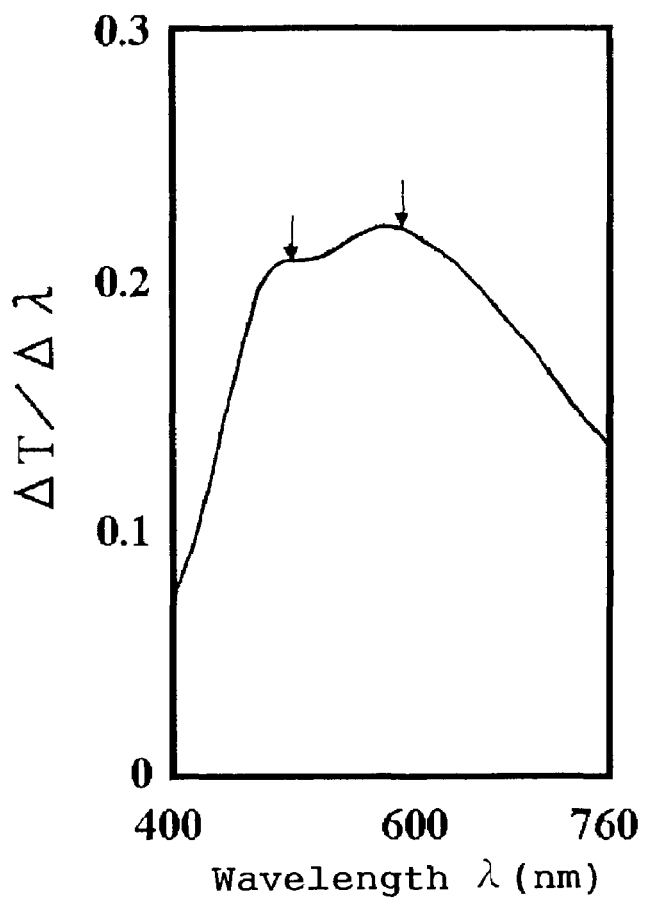
FIG. 3 shows a primary differential transmittance spectrum of a titanium oxide dispersion composition in the present invention (see, Example 1)

A transmittance spectrum of the titanium oxide dispersion composition was obtained after adding ion-exchange water to adjust a solid content of the dispersion composition to be about 2% by weight, and then a primary differential transmittance spectrum of the dispersion composition was obtained. The transmittance spectrum and the primary differential transmittance spectrum are shown in FIG. 2 and FIG. 3, respectively. The primary differential transmittance spectrum has maximum intensities at a wavelength of 496.5 nm and at a wavelength of 588.0 nm. The transmittance $T_1$ of this dispersion composition at 800 nm was 72.91%, and the transmittance $T_2$ at 400 nm was 1.33%. The index X ($=T_2/T_1$) was 0.018.

Formation of Titanium Oxide Film

The above-obtained dispersion composition containing 2% by weight of titanium oxide was applied to one side of surfaces of a slide glass (having a length of 76 mm, a width of 26 mm and a thickness of 1 mm) on a spin coater (model number "1H-D3", manufactured by Mikasa). By rotating the spin coater at 300 rpm for 5 seconds and then at 500 rpm for 30 seconds, the extra amount of the dispersion composition was removed. After that, the slide glass was dried at a temperature of 110° C. The steps of such an applying the dispersion composition onto the slide glass and drying the slide glass were repeated two times, to form a titanium oxide film on the entire surface of the slide glass. The titanium oxide film on the slide glass was irradiated with light using a black light as a light source, and then was preserved for three days in a light-shielding desiccator containing a drying agent.

Evaluation of Hydrophilicity of Titanium Oxide Film

With respect to the above-obtained titanium oxide film, the contact angle of a water droplet was measured by employing a contact angle meter (model "CA-A", manufactured by Kyowa Interfacial Science).

After the measurement, visible light rays were irradiated to the specimen for 9 hours at a temperature of 25° C. by employing a light source apparatus (trade name "Optical Modulex SX-UI500XQ", manufactured by Ushio Inc.) equipped with a 500W xenon lamp (trade name "Lamp UXL-500SX", manufactured by Ushio Inc.) and further a filter for cutting UV rays with wavelength of about 430 nm or shorter (trade name "Y-45", manufactured by Asahi Techno Glass Co., Ltd.) and a filter for cutting IR rays with wavelength of about 830 nm or longer (trade name "Super Gold Filter", manufactured Ushio Inc.) both attached thereto. With respect to the titanium oxide film obtained after the irradiation, the contact angle of a water droplet was measured in the same manner as above.

The contact angles of a water droplet of the titanium oxide film before and after the irradiation were 19° and 12°, respectively. The results show that the hydrophilicity of the titanium oxide film was improved by the light irradiation.

Comparative Example 1

Figure 4:
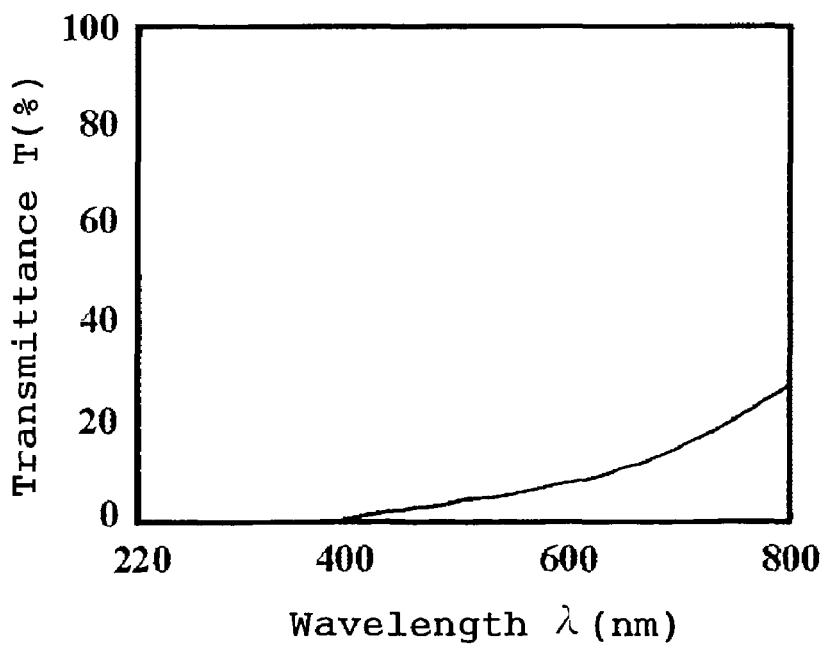
FIG. 4 shows a transmittance spectrum of a titanium oxide dispersion composition (prepared in Comparative Example 1)
Figure 5:
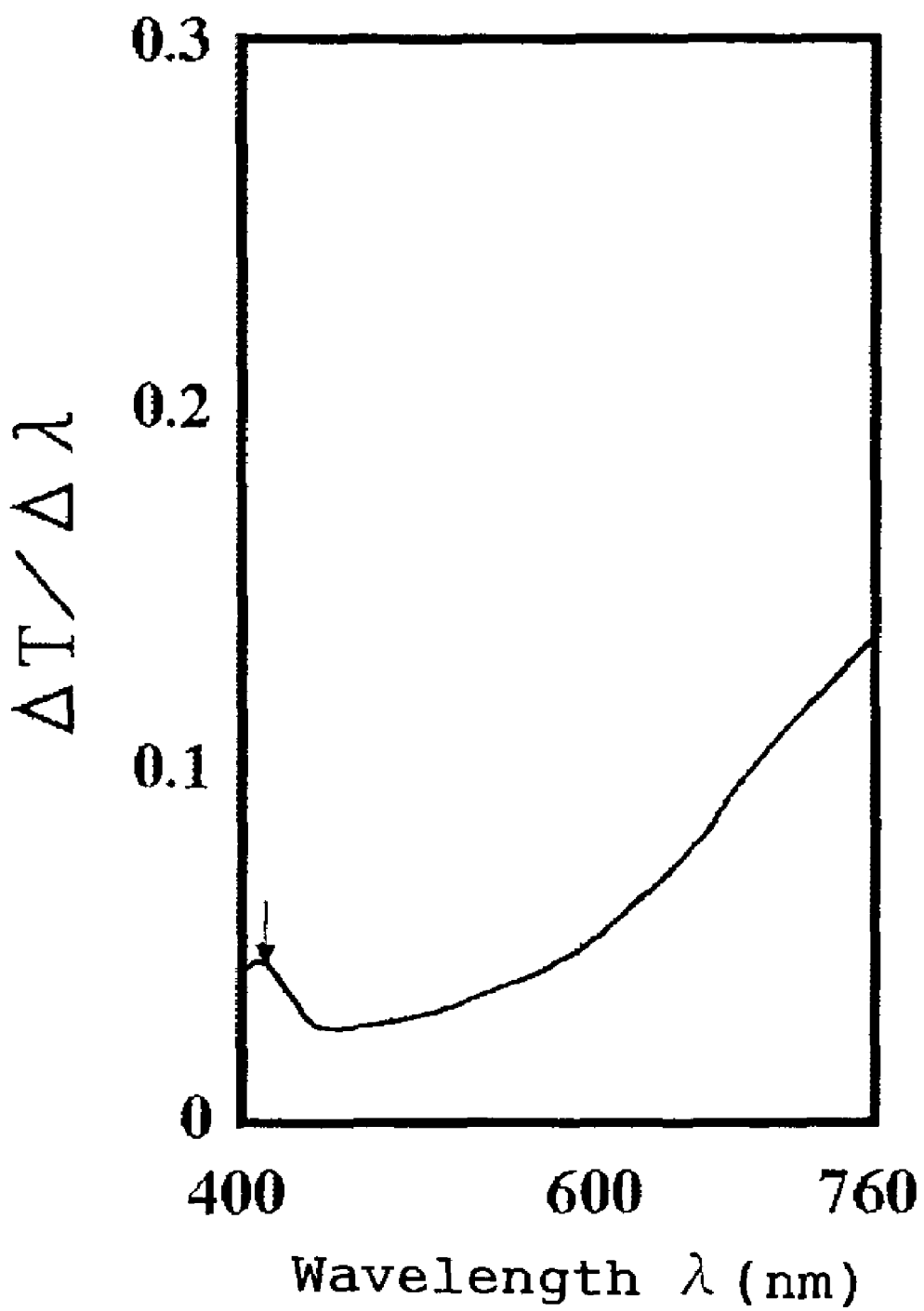
FIG. 5 shows a primary differential transmittance spectrum of a titanium oxide dispersion composition (prepared in Comparative Example 1).

A commercially available titanium oxide coating agent for photochatalyst (trade name: STS-02, solid content: 30% by weight, average secondary particle diameter of titanium oxide in the agent: 94 nm, manufactured by Ishihara Sangyo Kaisya, Ltd.) was adjusted to have a solid content of 2% by weight. A transmittance spectrum of the resulting agent was measured, a primary differential transmittance spectrum thereof was obtained. The transmittance spectrum and the primary differential transmittance spectrum are shown in FIG. 4 and FIG. 5, respectively. The primary differential transmittance spectrum has a maximum intensity at a wavelength of 410.5 nm.

The same process was carried out as described in formation of titanium oxide film in the Example 1 to obtain a titanium oxide film on an entire surface of a slide glass, except that the commercially available titanium oxide coating agent (trade name: STS-02) was used. With respect to the obtained titanium oxide film, a hydrophilicity of titanium oxide film was evaluated in the same conditions as described in evaluation of hydrophilicity in the Example 1, except that light irradiation was conducted for 34 hours. As a result, the contact angles of a water droplet of the titanium oxide film before and after the light irradiation were not change and were both 21°. The results show that the hydrophilicity of the titanium oxide film was not improved by the light irradiation.

What is claimed is:

1. A titanium oxide dispersion composition comprising a solvent and a titanium oxide with an average secondary particle diameter of about 100 nm or smaller, the dispersion composition having a maximum intensity within the range of from 435 nm to 700 nm of a primary differential spectrum of a transmittance spectrum, wherein the transmittance spectrum is measured using an ultraviolet-visible spectrophotometer after adjusting a solid content of the dispersion composition to be about 2% by weight, wherein the composition has index X of about 0.175 or less, index X being calculated by formula (1) below:

$$X = T_2/T_1 \tag{1}$$

wherein $T_1$ (%) is a transmittance at a wavelength of 800 nm and $T_2$ (%) is a transmittance at a wavelength of 400 nm of a transmittance spectrum of the composition.

2. A titanium oxide dispersion composition according to claim 1, wherein the composition has index X of about 0.025 or less.

3. A container for preserving the titanium oxide dispersion composition of claim 1 in a container comprising a wall with a transmittance of about 10 % or lower of the light having a wavelength ranging from 400 nm to 600 nm and with a transmittance of about 20% or higher of the light having a wavelength ranging from 600 nm to 800 nm.

4. A titanium oxide dispersion composition according to claim 1, wherein the average secondary particle diameter is about 40 nm or smaller.

5. A titanium oxide dispersion composition according to claim 4, wherein the composition has index X of about 0.025 or less.

* * * * *